(12) United States Patent
Nanri et al.

(10) Patent No.: US 11,433,589 B2
(45) Date of Patent: Sep. 6, 2022

(54) INJECTION MOLDING MACHINE AND SCREW CONTROL METHOD FOR INJECTION MOLDING MACHINE

(71) Applicant: FANUC CORPORATION, Yamanashi (JP)

(72) Inventors: Kodai Nanri, Yamanashi (JP); Junpei Maruyama, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/589,484

(22) Filed: Oct. 1, 2019

(65) Prior Publication Data
US 2020/0101652 A1  Apr. 2, 2020

(30) Foreign Application Priority Data

Oct. 2, 2018 (JP) .............................. JP2018-187724

(51) Int. Cl.
*B29C 45/80* (2006.01)
*B29C 45/50* (2006.01)
*B29C 45/76* (2006.01)

(52) U.S. Cl.
CPC ............. *B29C 45/80* (2013.01); *B29C 45/50* (2013.01); *B29C 45/5008* (2013.01); *B29C 45/768* (2013.01); *B29C 2945/7602* (2013.01); *B29C 2945/7612* (2013.01); *B29C 2945/76083* (2013.01); *B29C 2945/76113* (2013.01); *B29C 2945/76187* (2013.01); *B29C 2945/76214* (2013.01); *B29C 2945/76511* (2013.01); *B29C 2945/76692* (2013.01)

(58) Field of Classification Search
None
See application file for complete search history.

(56) References Cited

U.S. PATENT DOCUMENTS 4,975,227 A * 12/1990 Kamiguchi ............. B29C 45/76
425/149
5,260,008 A    11/1993 Yokota
(Continued)

FOREIGN PATENT DOCUMENTS

CN          10555505 A    10/1991
CN          106182652 A   12/2016
(Continued)

*Primary Examiner* — Niki Bakhtiari
*Assistant Examiner* — John J DeRusso
(74) *Attorney, Agent, or Firm* — Robert P. Michal, Esq.; Carter, DeLuca & Farrell LLP

(57) ABSTRACT

An injection molding machine includes: a screw inserted in an injection cylinder and configured to be movable in the axial direction; a motor configured to move the screw; a torque detection unit configured to detect the torque of the motor; a position detection unit configured to detect the position of the screw; a motor drive control unit configured to drive the motor while imposing torque limitation so that the motor's torque will not exceed a limit torque, to thereby advance the screw to the foremost position in the direction of injection; and a determination unit configured to determine that unmelted resin remains inside the injection cylinder if the moving speed of the screw becomes lower than or equal to a predetermined speed while the screw is advancing to the foremost position.

12 Claims, 5 Drawing Sheets

(56) References Cited

U.S. PATENT DOCUMENTS

| | | | |
|---|---|---|---|
| 6,328,551 B1 * | 12/2001 | Takatsugi | B29C 45/84 425/145 |
| 2016/0158985 A1 * | 6/2016 | Fitzpatrick | G05B 19/042 700/202 |

FOREIGN PATENT DOCUMENTS

| | | |
|---|---|---|
| CN | 106182653 A | 12/2016 |
| DE | 102008016002 A1 | 10/2008 |
| JP | 02-062220 A | 3/1990 |
| JP | H07241851 A | 9/1995 |
| JP | 2001079904 A | 3/2001 |
| JP | 2005014308 A | 1/2005 |

* cited by examiner

INJECTION MOLDING MACHINE AND SCREW CONTROL METHOD FOR INJECTION MOLDING MACHINE

CROSS-REFERENCE TO RELATED APPLICATION

This application is based upon and claims the benefit of priority from Japanese Patent Application No. 2018-187724 filed on Oct. 2, 2018, the contents of which are incorporated herein by reference.

BACKGROUND OF THE INVENTION

Field of the Invention

The present invention relates to an injection molding machine and a screw control method for the injection molding machine.

Description of the Related Art

In the injection molding technology, if the screw in the injection cylinder is operated in a state where the resin solidified inside the injection cylinder of the injection molding machine is not completely melted, there is a risk of the screw being broken. Since it is often difficult to visually check the interior of the injection cylinder directly from the outside, methods for confirming the presence or absence of unmelted resin are demanded.

Japanese Laid-Open Patent Publication No. 02-062220 discloses an injection molding machine in which, before the interlock is released, melting of the resin inside the injection cylinder is confirmed by heating the injection cylinder to a predetermined temperature, flowing a hydraulic oil into the injection cylinder after a lapse of a predetermined time, and then checking whether or not the screw is moved by the pressure of the hydraulic oil.

SUMMARY OF THE INVENTION

In the above disclosed technology, melting of the resin is confirmed based on the movement of the screw, so the melting of the resin is confirmed in only the vicinity of the screw. Therefore, there remains a possibility that unmelted resin is present within the movable range of the screw. Therefore, even if melting of the resin can be confirmed by the above technique, there is a risk that the screw may be broken when the screw is actually moved.

It is therefore an object of the present invention to provide an injection molding machine that prevents breakage of a screw due to unmelted resin, as well as providing a screw control method for the injection molding machine.

A first aspect of the present invention resides in an injection molding machine including: a screw inserted in the injection cylinder and configured to be movable in the axial direction; a motor configured to move the screw; a torque detection unit configured to detect the torque of the motor; a position detection unit configured to detect the position of the screw; a motor drive control unit configured to drive the motor while imposing torque limitation so that the torque of the motor will not exceed a limit torque, to thereby advance the screw to the foremost position in the direction of injection; and a determination unit configured to determine that unmelted resin remains inside the injection cylinder if the moving speed of the screw becomes lower than or equal to a predetermined speed while the screw is advancing to the foremost position.

A second aspect of the present invention resides in a screw control method for controlling screw movement in an injection molding machine which includes: a screw inserted in the injection cylinder and configured to be movable in the axial direction; a motor configured to move the screw; a torque detection unit configured to detect the torque of the motor; and a position detection unit configured to detect the position of the screw, and the screw control method includes: a motor drive control step of driving the motor while imposing torque limitation so that the torque of the motor will not exceed a limit torque, to thereby advance the screw to the foremost position in the direction of injection; and a determining step of determining that unmelted resin remains inside the injection cylinder if the moving speed of the screw becomes lower than or equal to a predetermined speed while the screw is advancing to the foremost position.

According to the present invention, it is possible to confirm the melting of the resin over the movement range of the screw in the injection cylinder. Therefore, breakage of the screw due to unmelted resin can be prevented.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

An injection molding machine according to the present invention and a screw control method for the injection molding machine will be detailed below by describing a preferred embodiment with reference to the accompanying drawings.

Embodiment

Figure 1:
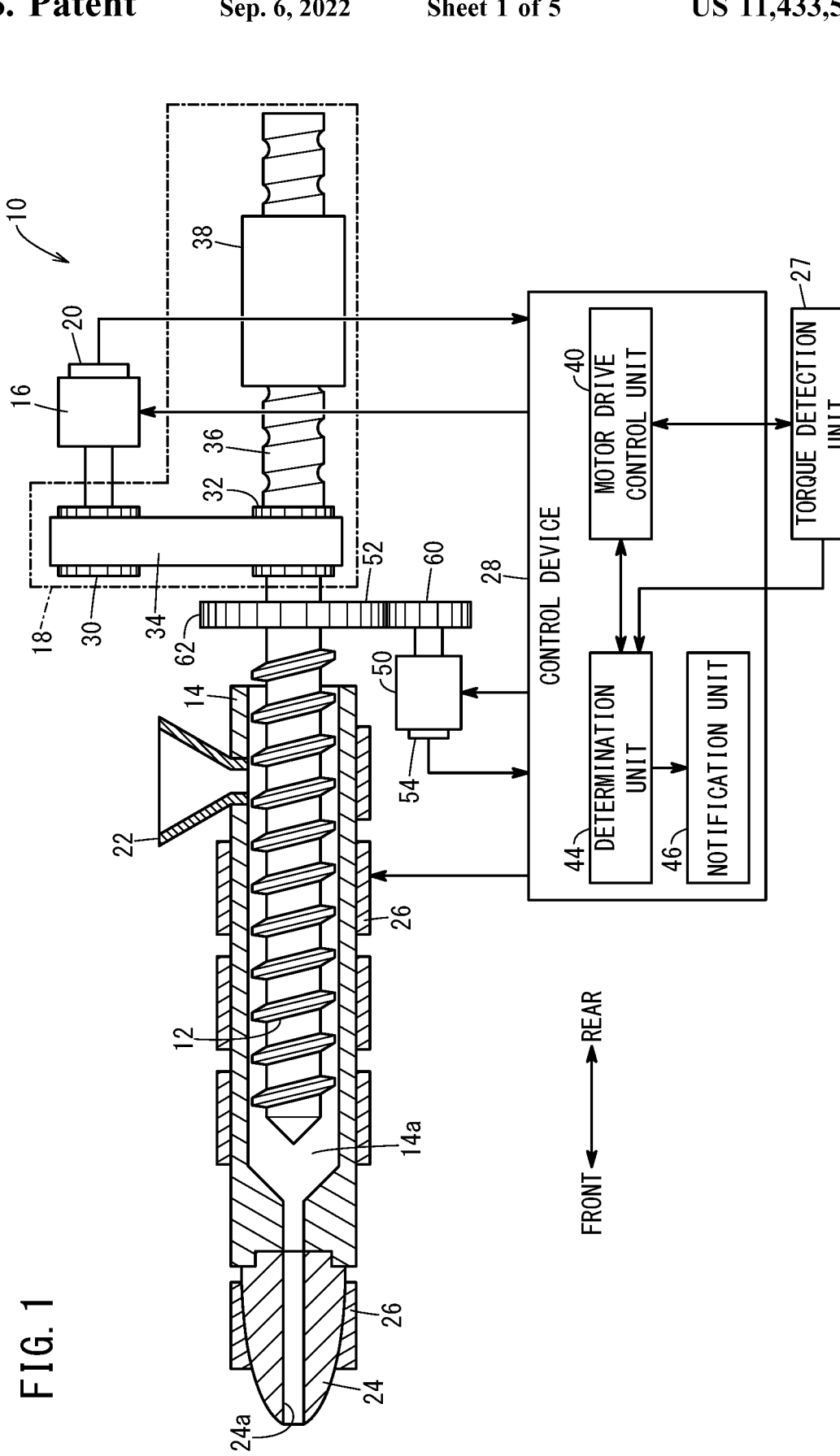
FIG. 1 is a configuration diagram schematically illustrating part of an injection molding machine according to an embodiment.

FIG. 1 is a configuration diagram schematically illustrating part of an injection molding machine 10 according to the present embodiment. The injection molding machine 10 includes a screw 12, an injection cylinder 14, a linear motion servomotor 16, a power transmission mechanism 18, encoders 20 and 54, a hopper 22, a nozzle 24, a heater 26, a torque detection unit 27, a control device 28, a rotational motion servomotor 50, a gear mechanism 52 and the like.

The screw 12 is inserted in the injection cylinder 14 so as to be movable in its axial direction. A nozzle 24 is provided at the front end of the injection cylinder 14. Molten resin is ejected from the nozzle 24. The nozzle 24 has a nozzle hole 24a that communicates with a hollow portion 14a of the injection cylinder 14. As to the movement directions of the screw 12, the direction toward the nozzle 24 is referred to as the forward direction, and the opposite direction is referred to as the backward direction. As the screw 12 advances, the resin in the injection cylinder 14 is pushed forward and injected from the front end of the nozzle hole 24a into the cavity of an unillustrated mold.

The linear motion servomotor 16 is a drive source for moving the screw 12 in the axial direction of the injection cylinder 14.

The power transmission mechanism 18 includes pulleys 30, 32, an endless belt 34, a ball screw 36, a nut 38 and others. The pulley 30 and the endless belt 34 jointly form a mechanism for transmitting the rotational force of the linear motion servomotor 16 to the pulley 32. The ball screw 36, the pulley 32 attached to the ball screw 36 so as to rotate integrally with the ball screw 36, and the nut 38 screwed on the ball screw 36 convert the rotational force transmitted to the pulley 32 into linear motion. The nut 38 is fixed to and supported by an unillustrated support member. The screw 12 is connected to the ball screw 36, and moves straight as the ball screw 36 goes straight.

The encoder 20 is attached to the linear motion servomotor 16 and detects the rotational position of the linear motion servomotor 16. The position of the screw 12 in the axial direction and the moving speed V of the screw 12 can be determined from change in the rotational position detected by the encoder 20. The encoder 20 is an example of a position detection unit.

The rotational motion servomotor 50 is a drive source for rotating the screw 12 about the axis of the injection cylinder 14.

The gear mechanism 52 includes two gears 60 and 62 meshing with each other. The gear 60 transmits the rotational force of the rotational motion servomotor 50 to the gear 62. The shaft of the gear 62 is connected to the screw 12 so as to transmit the rotational force of the rotational motion servomotor 50 transmitted from the gear 60, to the screw 12. The screw 12 rotates as the gear 62 rotates. As a drive mechanism for transmitting the rotational force of the rotational motion servomotor 50 to the screw 12, a drive mechanism including a belt, pulleys and others may be used instead of the gear mechanism 52.

The encoder 54 is attached to the rotational motion servomotor 50 and detects the rotation angle of the rotational motion servomotor 50. The rotation angle ω of the screw 12 and the angular speed Vω can be determined from the change in the rotation angle detected by the encoder 54. The encoder 54 is another example of a position detection unit.

The hopper 22 supplies resin pellets into the injection cylinder 14. The heater 26 is arranged on the outer periphery of the injection cylinder 14 and the outer periphery of the nozzle 24. The heater 26 heats the resin thereinside by heating the injection cylinder 14 and the nozzle 24. Thus, the resin supplied into the injection cylinder 14 from the hopper 22 is melted. When heating by the heater 26 is stopped, the molten resin is solidified.

The torque detection unit 27 detects torque of each of the linear motion servomotor 16 and the rotational motion servomotor 50. The torque detection unit 27 in the present embodiment includes an ammeter to detect the current supplied from an aftermentioned motor drive control unit 40 in the control device 28 to each of the linear motion servomotor 16 and the rotational motion servomotor 50, and calculates the torques of the linear motion servomotor 16 and the rotational motion servomotor 50. The torque detection unit 27 may directly detect at least one of the torque of the linear motion servomotor 16 and the torque of the rotational motion servomotor 50.

The control device 28 controls the heater 26 to heat the resin, and then controls the linear motion servomotor 16 and others to move the screw 12 forward inside the injection cylinder 14 and inject the resin into the cavity. When the injecting operation by the control device 28 is temporarily interrupted or stopped, the operation of the heater 26 is also stopped and the resin cools and solidifies. The control device 28 controls the heater 26 again to heat and melt the resin, and then advances the screw 12. At this time, when unmelted resin remains in the injection cylinder 14, there is a risk that the screw 12 may be broken as the screw 12 is moved. In order to prevent such breakage of the screw 12, the control device 28 performs a control process of the screw 12 according to the present embodiment. This control process is a process for confirming whether or not the resin in the injection cylinder 14 is melted, and is implemented when heating is restarted after heating by the heater 26 has been stopped. The control device 28 includes a motor drive control unit 40, a determination unit 44, a notification unit 46 and others.

The control device 28 may be configured of, for example, a processor such as a central processing unit (CPU) or a micro processing unit (MPU), a memory such as a read only memory (ROM) or a random access memory (RAM), a servo amplifier and an output unit, such as an audio output device and a display device, connected to the processor via an output interface. The processor executes processing based on a program and various information stored in the memory, so as to be able to realize the function of the motor drive control unit 40 through the servo amplifier. The processor can also realize the function of the determination unit 44 by executing processing based on a program and various information stored in the memory. In addition, the function of the notification unit 46 can be realized by the output device.

The motor drive control unit 40 controls driving of the linear motion servomotor 16 to move the screw 12 in the injection cylinder 14 in the front-rear direction. The motor drive control unit 40 in the present embodiment moves the screw 12 to the foremost position. This foremost position is the foremost position in the movable range of the injection cylinder 14. The motor drive control unit 40 controls driving of the linear motion servomotor 16 so that the screw 12 moves at a predetermined moving speed $V_0$. The motor drive control unit 40 performs feedback control of the linear motion servomotor 16 based on the angular speed and the like detected by the encoder 20.

Here, the motor drive control unit 40 controls the linear motion servomotor 16 by applying torque limitation (i.e., imposing limitation on the torque) so that the torque τ of the linear motion servomotor 16 does not exceed a predetermined limit torque $τ_L$. The motor drive control unit 40 controls the linear motion servomotor 16 based on the torque τ detected by the torque detection unit 27.

The reason for limiting the torque is to prevent the screw 12 from being broken by unmelted resin because of the possibility that unmelted resin remains. The limit torque τL of the linear motion servomotor 16 is a torque that is greater than the torque τ of the linear motion servomotor 16 generated when the screw 12 advances in the molten resin. The motor drive control unit 40 can limit the torque τ of the linear motion servomotor 16 by limiting the current supplied to the linear motion servomotor 16.

In this case, when the screw 12 does not collide with the unmelted resin, the torque τ of the linear motion servomotor 16 becomes equal to or lower than the limit torque $τ_L$. However, when the screw 12 collides with the unmelted resin, the torque τ of the linear motion servomotor 16 increases and reaches the limit torque $τ_L$. Further, when the screw 12 collides with the unmelted resin and the torque τ of the linear motion servomotor 16 reaches the limit torque $τ_L$, the torque τ of the linear motion servomotor 16 will not become greater than the limit torque $τ_L$. Therefore, the moving speed V of the screw 12 becomes lower than the above-described predetermined moving speed $V_0$, and in some cases, the screw 12 stops.

From the above reasons, when the torque τ of the linear motion servomotor 16 reaches the limit torque $τ_L$ while the screw 12 is moving forward to the foremost position, and when the moving speed V of the screw 12 becomes lower than or equal to a predetermined speed $V_{TH}$, the determination unit 44 determines that unmelted resin remains in the injection cylinder 14. Here, it is assumed that predetermined speed $V_{TH}$ is smaller than predetermined moving speed $V_0$ ($V_{TH} < V_0$).

When it is determined that unmelted resin remains, the notification unit 46 notifies the fact that unmelted resin remains.

The motor drive control unit 40 can also control driving of the rotational motion servomotor 50 to rotate the screw 12. In this case, the motor drive control unit 40 may perform feedback control of the rotational motion servomotor 50 based on the angular speed or the like detected by the encoder 54.

Figure 2:
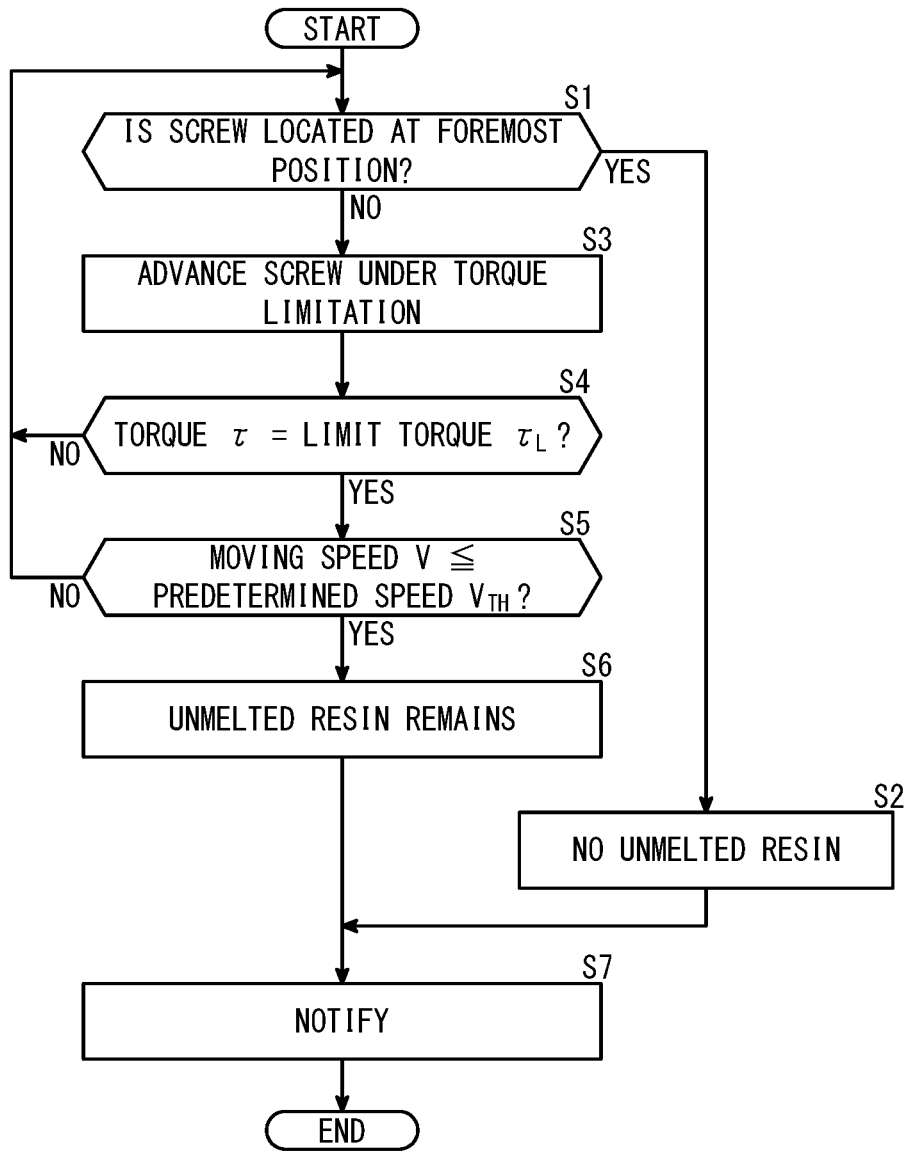
FIG. 2 is a flow chart showing an example of a screw control process in an injection molding machine according to the embodiment.

FIG. 2 is a flowchart showing an example of screw control processing of the injection molding machine 10 according to the present embodiment. The control process of the screw 12 shown in FIG. 2 is executed when heating of the resin by the heater 26 is resumed after heating of the resin by the heater 26 has been stopped.

At step S1, the determination unit 44 determines whether or not the screw 12 in the injection cylinder 14 is located at the foremost position. If the screw 12 is at the foremost position (step S1: YES), the determination unit 44 determines at step S2 that no unmelted resin remains inside the injection cylinder 14.

When it is determined at step S1 that the screw 12 is not located at the foremost position (step S1: NO), the motor drive control unit 40 controls driving of the linear motion servomotor 16 while imposing torque limitation, to advance the screw 12 at step S3. At this time, the motor drive control unit 40 drives the linear motion servomotor 16 so that the screw 12 moves at a predetermined moving speed $V_0$ until the torque τ detected by the torque detection unit 27 reaches the limit torque $τ_L$.

At step S4, the determination unit 44 determines whether or not the torque τ detected by the torque detection unit 27 has reached the limit torque $τ_L$. When the torque τ has not reached the limit torque $τ_L$ at step S4 (step S4: NO), the control process of the screw 12 returns to step S1. When the torque τ has reached the limit torque $τ_L$ (step S4: YES), the determination unit 44 determines whether or not the moving speed V of the screw 12 is equal to or lower than the predetermined speed $V_{TH}$ (i.e., whether $V \leq V_{th}$) at step S5.

When the moving speed V of the screw 12 is higher than the predetermined speed $V_{TH}$ (step S5: NO), the control process of the screw 12 returns to step S1. When the moving speed V of the screw 12 is equal to or lower than the predetermined speed $V_{TH}$ (step S5: YES), the determination unit 44 determines at step S6 that unmelted resin remains in the injection cylinder 14.

As shown in the flowchart of FIG. 2, when the screw 12 has moved to the foremost position, or when it is determined that unmelted resin remains, the operation of step S3 is not performed, so the screw 12 will stop. That is, after the operation at step S2 or step S6, the motor drive control unit 40 stops driving of the linear motion servomotor 16.

After the determination on the presence or absence of unmelted resin by the determination unit 44 at step S2 or step S6, the notification unit 46 receives the determination result from the determination unit 44 and notifies the determination result at step S7.

As described above, by advancing the screw 12 while imposing torque limitation, it is possible to prevent the screw 12 from being damaged during the checking process for checking whether or not unmelted resin remains. Further, by determining the presence or absence of unmelted resin while advancing the screw 12 to the foremost position inside the injection cylinder 14, the presence of unmelted resin can be detected not only in the vicinity of the screw 12 but also in the entire moving range of the screw 12 in the injection molding process, and hence it is possible to prevent breakage of the screw 12 at the time of execution of an injection molding process.

In the above embodiment, when the torque τ of the linear motion servomotor 16 reaches the limit torque $τ_L$ (step S4; YES) and the moving speed V of the screw 12 becomes equal to or lower than the predetermined speed $V_{TH}$ (step S5: YES), it is determined that unmelted resin remains (step S6). However, the determination on the presence or absence of unmelted resin may omit the determination as to the torque τ of the linear motion servomotor 16. That is, regardless of the torque τ of the linear motion servomotor 16, when the moving speed V of the screw 12 becomes equal to or lower than the predetermined speed $V_{TH}$, it is possible to determine that there is remaining unmelted resin. In this case, the operation of step S4 in FIG. 2 is unnecessary.

Figure 3:
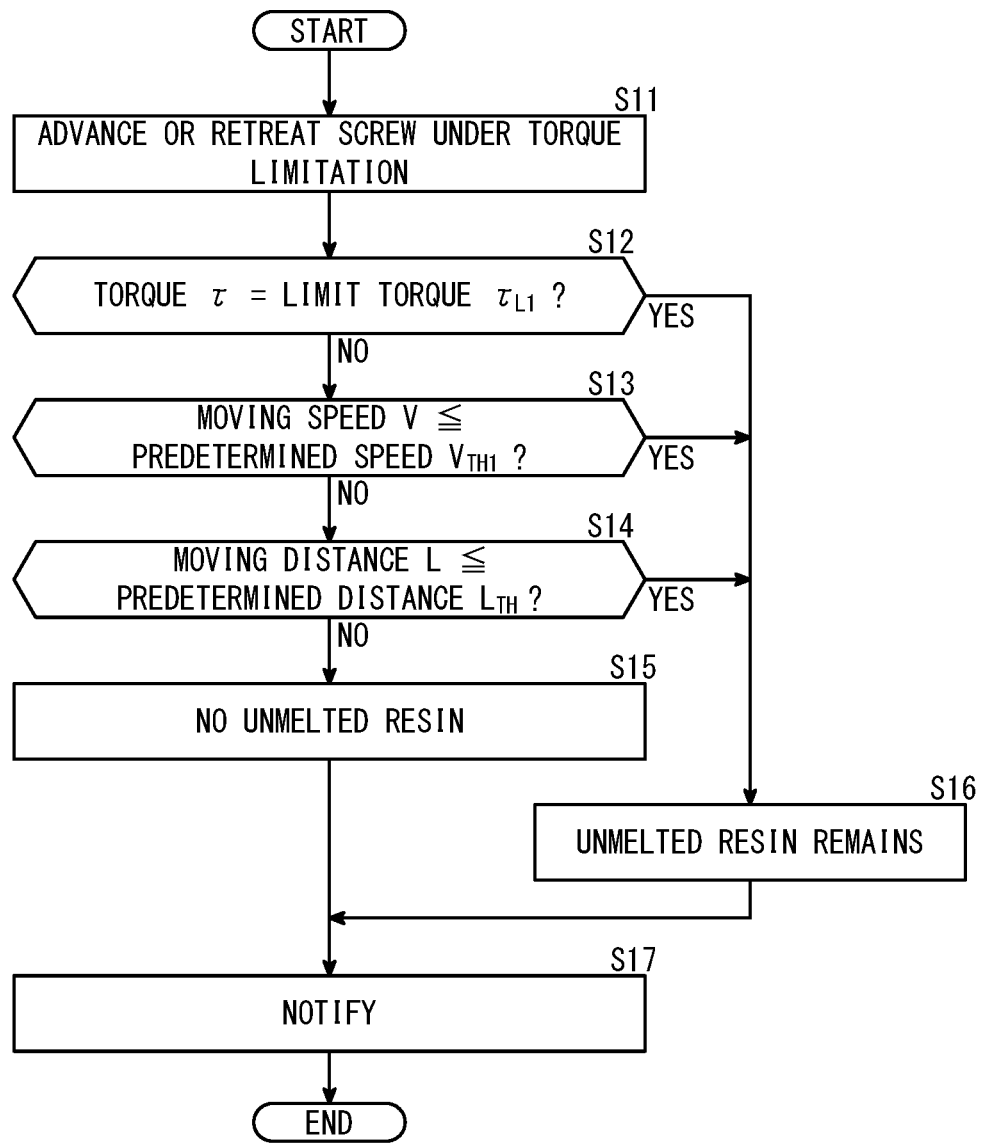
FIG. 3 is a flowchart showing an example of processing added to the screw control process of the injection molding machine according to the embodiment, to improve detection accuracy of unmelted resin.
Figure 4:
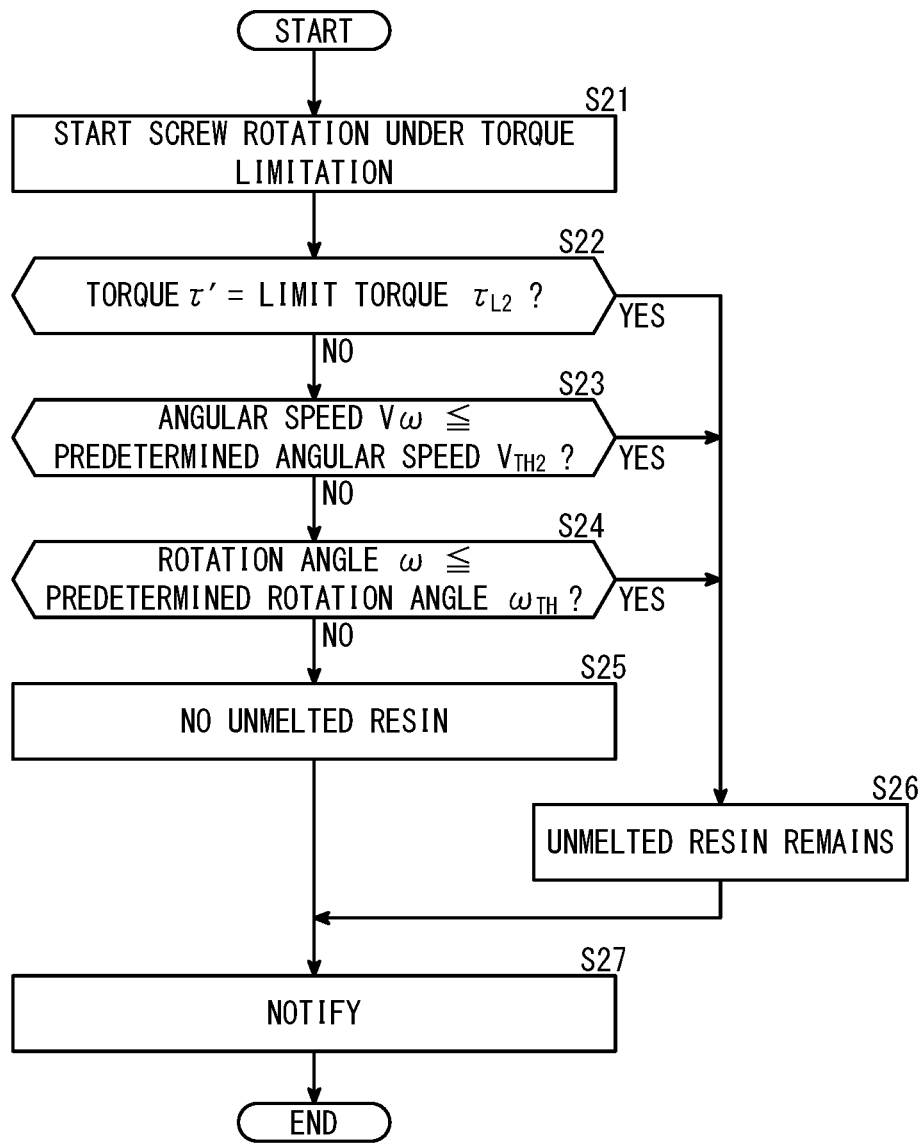
FIG. 4 is a flowchart showing another example of processing added to the screw control process of the injection molding machine according to the embodiment, to improve detection accuracy of unmelted resin.

In order to improve the detection accuracy of unmelted resin when, for example, the screw 12 is already located at the foremost position or in the vicinity thereof inside the injection cylinder 14, in executing the aforementioned screw control process, the injection molding machine 10 may be configured to perform at least one of the following processes shown in FIGS. 3 and 4 before or after the screw control process.

FIG. 3 is a flowchart showing an example of a process added to the screw control process of the injection molding machine 10 according to the present embodiment to improve the detection accuracy of unmelted resin. At step S11, the motor drive control unit 40 starts a process of advancing or retreating the screw 12 by controlling driving of the linear motion servomotor 16 while imposing torque limitation. Because of being driven under torque limitation, the torque τ of the linear motion servomotor 16 will not become greater than a limit torque $τ_{L1}$ of this process.

The limit torque $τ_{L1}$ is a torque that is greater than the torque τ of the linear motion servomotor 16 generated when the screw 12 advances or retreats in the melted resin. The limit torque $τ_{L1}$ may be equal to or different from the aforementioned limit torque $τ_L$. In the process shown in FIG. 3, the motor drive control unit 40 controls the drive of the linear motion servomotor 16 so as to move the screw 12 at a predetermined moving speed $V_1$ within the range in which the torque $\tau$ does not exceed the limit torque $\tau_{L1}$. The predetermined moving speed $V_1$ may be equal to or different from the predetermined moving speed $V_0$.

At step S12, the determination unit 44 determines whether or not the torque $\tau$ detected by the torque detection unit 27 has reached the limit torque $\tau_{L1}$. If the torque $\tau$ has not reached the limit torque $\tau_{L1}$ at step S12 (step S12: NO), the determination unit 44 determines at step S13 whether or not the moving speed V of the screw 12 is equal to or lower than a predetermined speed $V_{TH1}$ (i.e., whether V≤$V_{TH1}$). The predetermined speed $V_{TH1}$ may be equal to or different from the predetermined speed $V_{TH}$, but it is assumed that the predetermined speed $V_{TH1}$ is smaller than the predetermined moving speed $V_1$ ($V_{TH1}$<$V_1$).

When the moving speed V of the screw 12 is higher than the predetermined speed $V_{TH1}$ at step S13 (step S13: NO), the determination unit 44 determines whether or not the moving distance L of the screw 12 is equal to or smaller than a predetermined distance $L_{TH}$ at step S14 (i.e., whether L≤$L_{TH}$).

When the moving distance L of the screw 12 is longer than the predetermined distance $L_{TH}$ at step S14 (step S14: NO), the determination unit 44 determines at step S15 that no unmelted resin remains in injection cylinder 14.

On the other hand, when the torque $\tau$ has reached the limit torque $\tau_{L1}$ at step S12 (step S12: YES), when the moving speed V of the screw 12 is equal to or lower than the predetermined speed $V_{TH1}$ (step S13: YES), or when the moving distance L of the screw 12 is equal to or shorter than the predetermined distance $L_{TH}$ (step S14: YES), the determination unit 44 determines at step S16 that unmelted resin remains in the injection cylinder 14.

After determination on the presence or absence of unmelted resin at step S15 or step S16, the motor drive control unit 40 stops the drive of the linear motion servomotor 16 and the notification unit 46 notifies the determination result by the determination unit 44 at step S17.

FIG. 4 is a flowchart showing another example of a process added to the screw control process of the injection molding machine 10 according to the present embodiment to improve the detection accuracy of unmelted resin.

At step S21, the motor drive control unit 40 controls the drive of the rotational motion servomotor 50 while imposing the torque limitation to thereby start a process of rotating the screw 12. Because of the limitation on torque in driving, the torque τ' of the rotational motion servomotor 50 does not become greater than a limit torque $\tau_{L2}$ of this process.

The limit torque $\tau_{L2}$ is a torque that is greater than the torque τ' of the rotational motion servomotor 50 generated when the screw 12 rotates in the melted resin.

In the process shown in FIG. 4, the motor drive control unit 40 controls the drive of the rotational motion servomotor 50 so as to rotate the screw 12 at a predetermined rotational angular speed $V_2$ within the range in which the torque τ' does not exceed the limit torque $\tau_{L2}$.

At step S22, the determination unit 44 determines whether or not the torque τ' detected by the torque detection unit 27 has reached the limit torque $\tau_{L2}$. If the torque τ' does not reach the limit torque $\tau_{L2}$ at step S22 (step S22: NO), the determination unit 44 determines at step S23 whether or not the angular speed Vω of the screw 12 is equal to or lower than the predetermined rotational angular speed $V_{TH2}$ (i.e., whether Vω≤$V_{TH2}$). Here, it is assumed that the predetermined angular speed $V_{TH2}$ is smaller than the predetermined angular speed $V_2$ ($V_{TH2}$<$V_2$).

When the angular speed Vω of the screw 12 is higher than the predetermined angular speed $V_{TH2}$ at step S23 (step S23: NO), the determination unit 44 determines whether or not the rotation angle ω of the screw 12 is equal to or smaller than a predetermined rotation angle $\omega_{TH}$ at step S24 (i.e., whether ω≤$\omega_{TH}$).

When the rotation angle ω of the screw 12 is greater than the predetermined rotation angle $\omega_{TH}$ at step S24 (step S24: NO), the determination unit 44 determines that no unmelted resin remains in the injection cylinder 14 at step S25.

When the torque τ' has reached the limit torque $\tau_{L2}$ at step S22 (step S22: YES), when the angular speed Vω of the screw 12 is lower than the predetermined angular speed $V_{TH2}$ at step S23 (step S23: YES), or when the rotation angle ω of the screw 12 is equal to or smaller than the predetermined rotation angle $\omega_{TH}$ at step S24 (step S24: YES), the determination unit 44 determines that unmelted resin remains in the injection cylinder 14 at step S26.

After determination on the presence or absence of unmelted resin at step S25 or step S26, the motor drive control unit 40 stops the drive of the rotational motion servomotor 50, and the notification unit 46 notifies the determination result by the determination unit 44 at step S27.

Modification

The following modification can be made to the above embodiment.

The screw control process according to the above embodiment described with reference to FIG. 2 imposes limitation on the torque of the linear motion servomotor 16. The screw control process according to a modification is performed without using torque limitation, differing from the screw control process shown in FIG. 2. Now, the difference of the screw control process of this modification from that of the above embodiment will be described.

The motor drive control unit 40 in this modification does not limit the torque $\tau$ of the linear motion servomotor 16 when the screw 12 is moved forward. Since the motor drive control unit 40 does not perform torque limitation, even if the screw 12 collides with unmelted resin, the linear motion servomotor 16 is continuously controlled so that the moving speed V of the screw 12 becomes the predetermined moving speed $V_0$. Therefore, the torque $\tau$ of the linear motion servomotor 16 continues to increase.

Therefore, when the torque $\tau$ of the linear motion servomotor 16 becomes equal to or greater than the limit torque $\tau_L$ while the screw 12 is advancing toward the foremost position, the determination unit 44 determines that unmelted resin remains in the injection cylinder 14.

When the screw 12 reaches the foremost position, or when it is determined that unmelted resin remains, the motor drive control unit 40 stops the drive of the linear motion servomotor 16 to stop movement of the screw 12.

Figure 5:
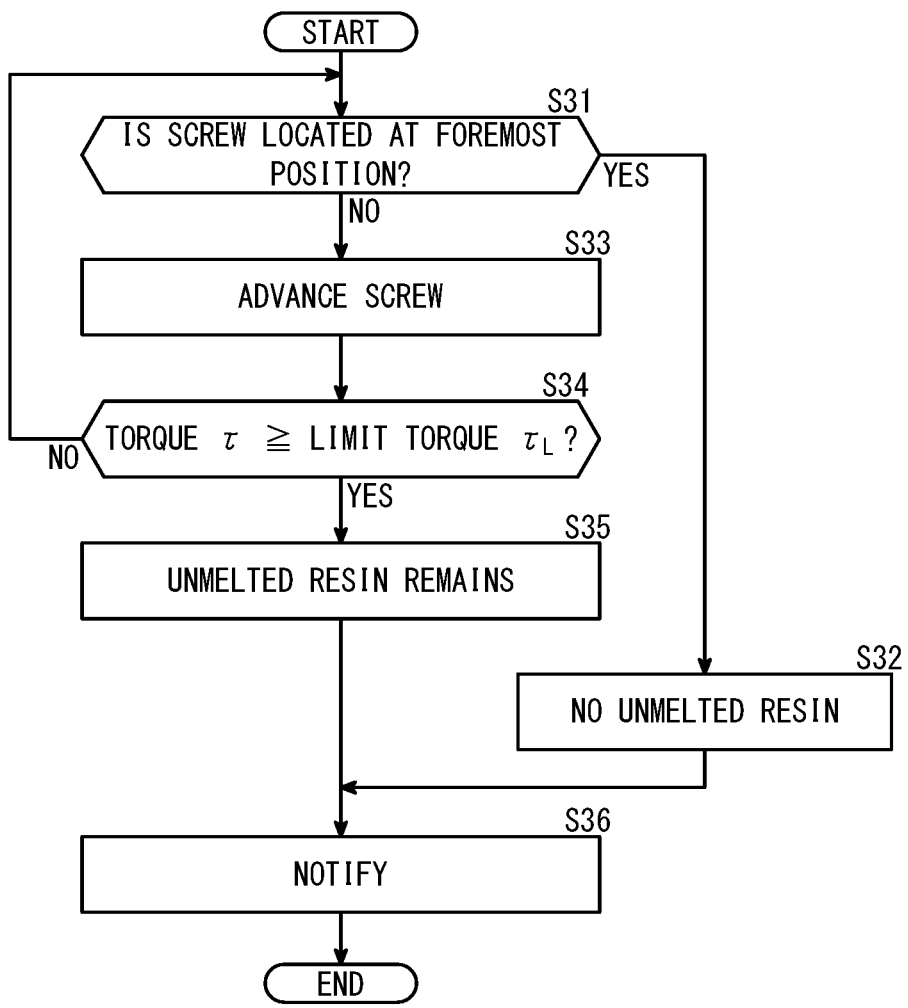
FIG. 5 is a flowchart showing an example of a screw control process in an injection molding machine according to a modification.

FIG. 5 is a flowchart showing an example of a screw control process of the injection molding machine 10 according to the modification. At step S31, the determination unit 44 determines whether or not the screw 12 is located at the foremost position in the injection cylinder 14. If the screw 12 is located at the foremost position (step S31: YES), the determination unit 44 determines at step S32 that no unmelted resin remains in the injection cylinder 14.

When it is determined at step S31 that the screw 12 is not located at the foremost position (step S31: NO), the motor drive control unit 40 drives the linear motion servomotor 16 so as to move the screw 12 forward at step S33. As described above, herein the motor drive control unit 40 drives the linear motion servomotor 16 without imposing torque limitation.

At step S34, the determination unit 44 determines whether or not the torque τ detected by the torque detection unit 27 is equal to or greater than a predetermined limit torque $τ_L$ (i.e., whether $τ≥τ_L$). If the torque τ is lower than the limit torque $τ_L$ (step S34: NO), the process by the injection molding machine 10 returns to step S31. If the torque τ is equal to or greater than the limit torque $τ_L$ (step S34: YES), the determination unit 44 determines at step S35 that unmelted resin remains in the injection cylinder 14.

As shown in the flowchart of FIG. 5, when the screw 12 moves to the foremost position, or when it is determined that unmelted resin remains, the operation of step S33 is not performed, so the screw 12 will stop. That is, after the operation of step S32 or step S35, the motor drive control unit 40 stops the drive of the linear motion servomotor 16. Thus, according to this modification, the same effect as that in the above-mentioned embodiment can be obtained. In addition, since it is not necessary to impose torque limitation while moving the screw 12 forward, the control can be simplified.

After the determination on the presence or absence of unmelted resin by the determination unit 44 at step S32 or step S35, the notification unit 46 receives the determination result from the determination unit 44 and notifies the determination result at step S36.

According to the modification, the same effect as that in the above embodiment can be obtained. In addition, since it is not necessary to impose torque limitation while moving the screw 12 forward, the control can be simplified.

Technical Ideas Obtained from the Embodiment

The technical ideas that can be grasped from the above embodiment will be described below.

First Technical Idea

The injection molding machine (10) includes: a screw (12) inserted in the injection cylinder (14) and configured to be movable in the axial direction; a motor (16) configured to move the screw (12); a torque detection unit (27) configured to detect the torque (τ) of the motor (16); a position detection unit (20) configured to detect the position of the screw (12); a motor drive control unit (40) configured to drive the motor (16) while imposing torque limitation so that the motor's torque will not exceed a limit torque ($τ_L$), to thereby advance the screw (12) to the foremost position in the direction of injection; and a determination unit (44) configured to determine that unmelted resin remains inside the injection cylinder (14) if the moving speed (V) of the screw (12) becomes lower than or equal to a predetermined speed ($V_{TH}$) while the screw (12) is advancing to the foremost position.

This configuration makes it possible to confirm the melting of the resin over the movement range of the screw (12) inside the injection cylinder (14) and prevent the screw (12) from being broken by unmelted resin.

The determination unit (44) may determine that unmelted resin remains inside the injection cylinder (14) if the motor (16)'s torque (τ) reaches the limit torque ($τ_L$) and the moving speed (V) of the screw (12) becomes lower than or equal to the predetermined speed ($V_{TH}$) while the screw (12) is advancing to the foremost position. Thereby, it is possible to more reliably confirm the melting of the resin over the movement range of the screw (12) inside the injection cylinder (14) and prevent the screw (12) from being broken by unmelted resin.

The injection molding machine (10) includes: a screw (12) inserted in the injection cylinder (14) and configured to be movable in the axial direction; a motor (16) configured to move the screw (12); a torque detection unit (27) configured to detect the torque (τ) of the motor (16); a position detection unit (20) configured to detect the position of the screw (12); a motor drive control unit (40) configured to drive the motor (16) to thereby advance the screw (12) to the foremost position in the direction of injection; and a determination unit (44) configured to determine that unmelted resin remains inside the injection cylinder (14) if the motor (16)'s torque (τ) becomes equal to or greater than a limit torque ($τ_L$) while the screw (12) is advancing to the foremost position.

This configuration makes it possible to confirm the melting of the resin over the movement range of the screw (12) inside the injection cylinder (14) and prevent the screw (12) from being broken by unmelted resin.

The motor drive control unit (40) may stop driving of the motor (16) if it is determined that unmelted resin remains. Thus, breakage of the screw (12) can be prevented in the screw control process.

The injection molding machine (10) may further include a notification unit (46) configured to notify the fact that unmelted resin remains if it is determined that unmelted resin remains. This allows the operator to recognize that unmelted resin is present in the injection cylinder (14) and take appropriate measures.

The injection molding machine (10) may further include a heater (26) configured to heat the resin in the injection cylinder (14), and the motor drive control unit (40) may drive the motor (16) so as to advance the screw (12) to the foremost position when heating by the heater (26) is restarted after heating by the heater (26) has been stopped. This configuration makes it possible to detect unmelted resin remaining when melting the solidified resin, and hence prevent breakage of the screw (12).

Second Technical Idea

A screw control method controls screw movement in an injection molding machine (10) which includes: a screw (12) inserted in the injection cylinder (14) and configured to be movable in the axial direction; a motor (16) configured to move the screw (12); a torque detection unit (27) configured to detect the torque (τ) of the motor (16); and a position detection unit (20) configured to detect the position of the screw (12). The screw control method includes: a motor drive control step of driving the motor (16) while imposing torque limitation so that the motor's torque will not exceed a limit torque (τL), to thereby advance the screw (12) to the foremost position in the direction of injection; and a determining step of determining that unmelted resin remains inside the injection cylinder (14) if the moving speed (V) of the screw (12) becomes lower than or equal to a predetermined speed ($V_{TH}$) while the screw (12) is advancing to the foremost position.

This method makes it possible to confirm the melting of the resin over the movement range of the screw (12) inside the injection cylinder (14) and prevent the screw (12) from being broken by unmelted resin.

The determining step may determine that unmelted resin remains inside the injection cylinder (14) if the motor (16)'s torque reaches the limit torque ($τ_L$) and the moving speed (V) of the screw (12) becomes lower than or equal to the predetermined speed ($V_{TH}$) while the screw (12) is advancing to the foremost position. Thereby, it is possible to more reliably confirm the melting of the resin over the movement range of the screw (12) inside the injection cylinder (14) and prevent the screw (12) from being broken by unmelted resin.

A screw control method controls screw movement in an injection molding machine (10) which includes: a screw (12) inserted in the injection cylinder (14) and configured to be movable in the axial direction; a motor (16) configured to move the screw (12); a torque detection unit (27) configured to detect the torque ($\tau$) of the motor (16); and a position detection unit (20) configured to detect the position of the screw (12). The screw control method includes: a motor drive control step of driving the motor (16) to thereby advance the screw (12) to the foremost position in the direction of injection; and a determination step of determining that unmelted resin remains inside the injection cylinder (14) if the motor (16)'s torque ($\tau$) becomes equal to or greater than a limit torque ($\tau_L$) while the screw (12) is advancing to the foremost position.

This method makes it possible to confirm the melting of the resin over the movement range of the screw (12) inside the injection cylinder (14) and prevent the screw (12) from being broken by unmelted resin.

The motor drive control step may stop driving of the motor (16) if it is determined that unmelted resin remains. Thus, breakage of the screw (12) can be prevented in the screw control process.

The screw control method may further include a notification step of notifying the fact that unmelted resin remains if it is determined that unmelted resin remains. This allows the operator to recognize that unmelted resin is present in the injection cylinder (14) and take appropriate measures.

The injection molding machine (10) may further include a heater (26) configured to heat the resin in the injection cylinder (14), and the motor drive control step may drive the motor (16) so as to advance the screw (12) to the foremost position when heating by the heater (26) is restarted after heating by the heater (26) has been stopped. This method makes it possible to detect unmelted resin remaining when melting the solidified resin, and hence prevent breakage of the screw (12).

The present invention is not particularly limited to the embodiment described above, and various modifications are possible without departing from the essence and gist of the present invention.

What is claimed is:

1. An injection molding machine comprising:
a screw inserted in an injection cylinder and configured to be movable in an axial direction of the screw;
a motor configured to advance the screw through a range of advancing positions to a foremost position;
a torque detection unit configured to detect a torque of the motor;
a position detection unit configured to detect a position of the screw in the range of advancing positions;
a motor drive control unit configured to drive the motor while imposing torque limitation so that the torque of the motor does not exceed a limit torque, to thereby advance the screw to the foremost position in a direction of injection; and
a determination unit configured to determine moving speeds of the screw in the range of advancing positions, the determination unit configured to determine if one of the moving speeds becomes lower than or equal to a predetermined speed while the screw is advancing along the range of advancing positions to the foremost position, and wherein the determination unit is configured to determine if unmelted resin remains inside the injection cylinder based on the moving speeds of the screw in the advancing positions.

2. The injection molding machine according to claim 1, wherein the determination unit is configured to determine that unmelted resin remains inside the injection cylinder if the torque of the motor reaches the limit torque and one of the moving speeds of the screw becomes lower than or equal to the predetermined speed while the screw is advancing to the foremost position.

3. The injection molding machine according to claim 1, wherein the motor drive control unit is configured to stop driving the motor if unmelted resin remains.

4. The injection molding machine according to claim 1, further comprising a notification unit configured to notify a fact that unmelted resin remains if it is determined that unmelted resin remains.

5. The injection molding machine according to claim 1, further comprising a heater configured to heat resin in the injection cylinder, wherein the motor drive control unit is configured to drive the motor so as to advance the screw to the foremost position when heating by the heater is restarted after heating by the heater has been stopped.

6. The injection molding machine according to claim 1, wherein
the foremost position is disposed inside the injection cylinder,
the determination unit is configured to determine whether the screw has reached the foremost position, and
the determination unit is configured to determine that unmelted resin remains inside the injection cylinder if one of the moving speeds of the screw becomes lower than or equal to the predetermined speed when the screw advances along the range of advancing positions toward the foremost position.

7. A screw control method for controlling screw movement in an injection molding machine which includes: a screw inserted in an injection cylinder and configured to be advanced in an axial direction of the screw through a range of advancing positions to a foremost position; a motor configured to advance the screw in the axial direction of the screw; a torque detection unit configured to detect a torque of the motor; and a position detection unit configured to detect a position of the screw in the range of advancing positions,
the screw control method comprising:
driving the motor while imposing torque limitation so that the torque of the motor does not exceed a limit torque, to thereby advance the screw to the foremost position in a direction of injection; and
determining moving speeds of the screw in the range of advancing positions;
determining if one of the moving speeds becomes lower than or equal to a predetermined speed while the screw is advancing along the range of advancing positions to the foremost position; and
determining if unmelted resin remains inside the injection cylinder based on the moving speeds of the screw in the advancing positions.

8. The screw control method for the injection molding machine according to claim 7, wherein determining if unmelted resin remains inside the injection cylinder based on the moving speeds of the screw in the advancing position includes determining if the torque of the motor reaches the limit torque.

9. The screw control method for the injection molding machine according to claim 7, wherein determining if unmelted resin remains inside the injection cylinder includes stopping the motor.

10. The screw control method for the injection molding machine according to claim 7, further comprising notifying a fact that unmelted resin remains when a determination unit of the injection molding machine determines that unmelted resin remains.

11. The screw control method for the injection molding machine according to claim 7, wherein:
- the injection molding machine further includes a heater configured to heat resin in the injection cylinder, and wherein the screw control method further includes:
- driving the motor so as to advance the screw to the foremost position when heating by the heater is restarted after heating by the heater has been stopped.

12. The screw control method for the injection molding machine according to claim 7, wherein the foremost position is disposed inside the injection cylinder, and wherein the screw control method further includes:
- determining whether the screw has reached the foremost position, and
- determining that unmelted resin remains inside the injection cylinder if one of the moving speeds of the screw becomes lower than or equal to the predetermined speed when the screw advances along the range of advancing positions toward the foremost position.

* * * * *